United States Patent
Coste et al.

(10) Patent No.: US 9,556,330 B2
(45) Date of Patent: Jan. 31, 2017

(54) TIRE TREAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Nathalie Coste, Clermont-Ferrand (FR); Guillaume Lemasson, Clermont-Ferrand (FR); Regis Schach, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/905,042

(22) PCT Filed: Jul. 8, 2014

(86) PCT No.: PCT/EP2014/064626
§ 371 (c)(1),
(2) Date: Jan. 14, 2016

(87) PCT Pub. No.: WO2015/007576
PCT Pub. Date: Jan. 22, 2015

(65) Prior Publication Data
US 2016/0160013 A1    Jun. 9, 2016

(30) Foreign Application Priority Data
Jul. 15, 2013   (FR) ...................................... 13 56922

(51) Int. Cl.
*B60C 1/00*      (2006.01)
*C08L 9/00*      (2006.01)
*C08L 23/22*     (2006.01)
*C08K 5/54*      (2006.01)
*C08L 23/28*     (2006.01)

(52) U.S. Cl.
CPC ................ *C08L 9/00* (2013.01); *B60C 1/0016* (2013.04); *C08L 23/22* (2013.01); *C08L 23/283* (2013.01); *C08K 5/54* (2013.01)

(58) Field of Classification Search
CPC .............. B60C 9/00; C08L 9/00; C08L 23/22; C08L 23/283; C08K 5/54
USPC .................................. 264/211, 175; 524/574
See application file for complete search history.

(56) References Cited

U.S. PATENT DOCUMENTS

| | | | |
|---|---|---|---|
| 6,060,552 A | 5/2000 | Kaido | |
| 2004/0030036 A1* | 2/2004 | Waddell | ............... C08L 23/283 524/567 |
| 2004/0087704 A1 | 5/2004 | Jones et al. | |
| 2012/0003409 A1 | 1/2012 | Lesage et al. | |

FOREIGN PATENT DOCUMENTS

| | | |
|---|---|---|
| EP | 1687370 B1 | 5/2008 |
| EP | 2502742 A2 | 9/2012 |
| FR | 2939142 | 6/2010 |
| WO | 02/32993 | 4/2002 |
| WO | 2005/017013 | 2/2005 |

* cited by examiner

*Primary Examiner* — Kelechi Egwim
(74) *Attorney, Agent, or Firm* — Dickinson Wright PLLC

(57) ABSTRACT

A tire tread that comprises a rubber composition based on an elastomer matrix that comprises more than 50% by weight of at least one butyl rubber, on a reinforcing filler and on a plasticizing system that comprises at least one polybutene oil having a glass transition temperature below −75° C.

A tire comprising such a tread has a good compromise between the wet grip performance and the rolling resistance performance.

27 Claims, No Drawings

TIRE TREAD

This application is a 371 national phase entry of PCT/EP2014/064626, filed 8 Jul. 2014, which claims benefit of French Patent Application No. 1356922, filed 15 Jul. 2013, the entire contents of which are incorporated herein by reference for all purposes.

BACKGROUND

1. Field

The present disclosure relates to tire treads comprising rubber compositions based on butyl rubber.

2. Description of Related Art

One of the requirements needed for a tire is to provide optimal grip on the road, especially on wet ground. One way of giving the tire increased grip on wet ground is to use a rubber composition in its tread, which composition has a broad hysteresis potential.

But at the same time, the tire tread must also minimize its contribution to the rolling resistance of the tire, that is to say have the lowest possible hysteresis. Thus, the rubber composition of the tread must satisfy two conflicting requirements, namely having a maximum hysteresis potential in order to satisfy the requirement of grip and having a hysteresis that is as low as possible in order to satisfy the requirement of rolling resistance.

Tire manufacturers have therefore proposed hysteretic materials, such as for example compositions based on copolymers of butadiene and styrene with a styrene weight content of at least 35%, rubber compositions comprising high contents of reinforcing fillers or plasticizers. But these solutions are generally obtained to the detriment of the rolling resistance.

It has also been proposed to introduce butyl rubber into the rubber compositions of the tire treads in order to improve their grip on wet ground. This is because butyl rubber is an elastomer whose dissipation potential is known and constitutes per se a good candidate for improving the grip, especially on wet ground, as U.S. Pat. No. 6,060,552 teaches. However, this patent also teaches that butyl rubber must be used at contents of at most 30 parts per hundred parts of elastomer (phr) in order to minimize its hysteretic contribution in the field of rolling resistance.

Patent EP 1 687 370 B1 discloses that the use, in a tire tread, of a rubber composition reinforced with a silica and comprising a certain content of butyl rubber and of glycerol trioleate makes it possible to improve the grip of the tire on wet ground. But this solution is not satisfactory with respect to the rolling resistance performance.

Satisfying both the requirement of grip, especially on wet ground, and of rolling resistance remains a constant concern of tire manufacturers.

SUMMARY

The Applicant companies have discovered during their research that the combined presence, in a composition, of butyl rubber as predominant elastomer and of a polybutene oil made it possible to improve the compromise between the wet grip performance and the rolling resistance performance of tire treads based on butyl rubber.

A first subject of the invention relates to a tire tread that comprises a rubber composition based on an elastomer matrix that comprises more than 50% by weight of at least one butyl rubber, on a reinforcing filler and on a plasticizing system that comprises at least one polybutene oil having a glass transition temperature below −75° C.

Another subject of the invention is a tire comprising a tread in accordance with the invention.

A further subject of the invention is a process for preparing a tire tread in accordance with the invention.

Another subject of the invention is a rubber composition that can be used in a tread, which composition is based on an elastomer matrix that comprises more than 50% by weight of at least one butyl rubber, on a reinforcing filler and on a plasticizing system that comprises at least one polybutene oil having a glass transition temperature below −75° C.

A further subject of the invention is a process for preparing a rubber composition that can be used in a tread and is defined as above with the distinctive feature that the reinforcing filler consists predominantly by weight of a reinforcing inorganic filler, which composition additionally comprises a coupling agent.

DETAILED DESCRIPTION OF THE INVENTION

Any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

The expression "composition based on" should be understood as meaning a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

All the percentages are percentages by mass unless otherwise indicated.

One essential feature of the elastomer matrix of the rubber composition of the tread in accordance with an embodiment of the invention is to comprise at least one butyl rubber, that is to say one or more butyl rubbers.

Butyl rubbers are well known to a person skilled in the art, especially for their property of impermeability to air. They are copolymers of isobutylene and a $C_4$ to $C_6$ diene, especially isoprene. Generally, these copolymers contain 1 to 5 mol % of diene units, especially isoprene units, and have a Mooney viscosity (ML 1+8 at 125° C.) of from 30 to 60.

The at least one butyl rubber may be a halogenated butyl rubber.

Halogenated butyl rubber refers to the halogenated copolymers of isobutylene and a $C_4$ to $C_6$ diene, especially isoprene. They are obtained by halogenation, especially by chlorination or bromination, of the copolymers of isobutylene and a $C_4$ to $C_6$ diene, especially isoprene. The halogenated copolymers of isobutylene and a $C_4$ to $C_6$ diene, especially isoprene, generally have a halogen content of 1 to 4% by weight of the weight of copolymer. The halogenated butyl rubber is preferably a brominated butyl rubber.

By extension of the definition of butyl rubber, the at least one butyl rubber may also be a terpolymer of isobutylene, para-methylstyrene and halogenated, preferably brominated, para-methylstyrene, sold under the name EXXPRO by EXXON or Polysar XL 10000 by Bayer.

The at least one butyl rubber is used at a content of greater than 50% by weight of the weight of the elastomer matrix of the rubber composition. At a content lower than the aforementioned content, the grip of the tread is insufficient. The higher the content of the at least one butyl rubber in the elastomer matrix of the rubber composition, the better the grip potential of the tread comprising the rubber composition. This content is preferably greater than 70%, more preferably greater than 80%, more preferably still greater than 90% by weight of the weight of the elastomer matrix of the rubber composition. Advantageously, this content is 100% by weight of the weight of the elastomer matrix of the rubber composition, that is to say the elastomer matrix consists of the at least one butyl rubber.

When the weight content of the at least one butyl rubber is less than 100% of the weight of the elastomer matrix, another essentially unsaturated diene elastomer or a mixture of essentially unsaturated diene elastomers is used to make the matrix up to 100%. The elastomer matrix then consists of the at least one butyl rubber and of essentially unsaturated diene elastomer.

"Essentially unsaturated" is understood to mean generally a diene elastomer resulting at least in part from conjugated diene monomers having a content of units of diene origin (conjugated dienes) which is greater than 15% (mol %). Polybutadienes, polyisoprenes including natural rubber, butadiene copolymers, isoprene copolymers and the mixtures of these elastomers are suitable as essentially unsaturated diene elastomer. Also suitable are the copolymers of conjugated diene monomers and vinylaromatic, in particular styrene, monomers.

The choice of the diene elastomer will be governed both by its glass transition temperature, Tg, and its weight content in the elastomer matrix, and also by the desired compromise between the grip on wet ground and the rolling resistance of the tire. If it is desired to improve more the rolling resistance performance, use is preferably made of a diene elastomer having a relatively low Tg, in particular below −25° C. If it is desired to improve more the grip on wet ground, use is preferably made of an elastomer having a Tg of at least −25° C. The improvement in the wet grip performance and in the rolling resistance performance increases with the content of the at least one butyl rubber in the elastomer matrix.

The rubber composition of the tread in accordance with an embodiment of the invention comprises any type of filler referred to as reinforcing, known for its abilities to reinforce a rubber composition which can be used for the manufacture of tires, for example a reinforcing organic filler, such as carbon black, a reinforcing inorganic filler, such as silica, or also a mixture of these two types of filler.

Such a reinforcing filler typically consists of nanoparticles, the (weight-)average size of which is less than a micrometer, generally less than 500 nm, usually between 20 and 200 nm, in particular and more preferably between 20 and 150 nm.

All carbon blacks, especially the blacks conventionally used in tire treads, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks. These carbon blacks can be used in the isolated state, as available commercially, or in any other form, for example as support for some of the rubber additives used.

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferably silica ($SiO_2$), are suitable in particular as reinforcing inorganic fillers. The silica used can be any reinforcing silica known to a person skilled in the art, in particular any precipitated or fumed silica exhibiting a BET specific surface area and a CTAB specific surface area both of less than 450 $m^2/g$.

Mention will also be made, as reinforcing inorganic filler, of mineral fillers of the aluminous type, in particular alumina ($Al_2O_3$) or aluminium (oxide)hydroxides, or else reinforcing titanium oxides, for example described in U.S. Pat. No. 6,610,261 and U.S. Pat. No. 6,747,087.

The physical state in which the reinforcing inorganic filler is present is not important, whether it is in the form of powder, micropearls, granules or else beads. Of course, the expression "reinforcing inorganic filler" is also understood to mean mixtures of various reinforcing inorganic fillers, in particular highly dispersible silicas as described above.

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to establish the bonding between the filler and the elastomer. By way of example, mention may be made, for example, of carbon blacks for tires, as described, for example, in patent documents WO 96/37547 and WO 99/28380.

Preferably, the content of total reinforcing filler is between 40 and 150 phr. Below 40 phr, the reinforcement of the rubber composition is insufficient to provide an adequate level of cohesion or wear resistance of the rubber composition. More preferably still, the content of total reinforcing filler is at least 50 phr. Above 150 phr, there is a risk of increasing the hysteresis and therefore the rolling resistance of the tires. For this reason, the content of total reinforcing filler is preferably within a range of from 50 to 120 phr.

According to one embodiment of the invention, the reinforcing filler comprises a reinforcing organic filler, preferably a carbon black.

According to another embodiment of the invention, the reinforcing filler comprises a reinforcing inorganic filler, preferably a silica.

According to one preferred embodiment of the invention, the reinforcing filler consists predominantly by weight of a reinforcing inorganic filler, which means that the reinforcing inorganic filler constitutes more than 50% by weight of the reinforcing filler of the rubber composition of the tread in accordance with an embodiment of the invention. This reinforcing inorganic filler is preferably a silica.

According to one particular embodiment where the reinforcing inorganic filler such as silica represents more than 50% by weight of the reinforcing filler, carbon black is used preferably at a content of less than 20 phr, more preferably less than 10 phr (for example between 0.5 and 20 phr, in particular between 2 and 10 phr), more preferably still less than 5 phr. In the ranges indicated, the colouring properties (black pigmenting agent) and UV-stabilizing properties of the carbon blacks are benefited from, without, moreover, adversely affecting the typical performances provided by the reinforcing inorganic filler.

In order to couple the reinforcing inorganic filler to at least one of the elastomers that constitute the elastomer matrix of the rubber composition, especially in the case where the inorganic filler constitutes more than 50% by weight of the reinforcing filler of the rubber composition, use is generally made, in a well known manner, of a coupling agent (or bonding agent). The expression "coupling agent" is understood more specifically to mean an agent capable of establishing a sufficient bond of chemical and/or physical nature between the filler in question and the elastomer, while facilitating the dispersion of this filler within the elastomer matrix.

This at least bifunctional agent is intended to ensure a sufficient connection, of chemical and/or physical nature, between the inorganic filler (surface of its particles) and the elastomer. Use is made, in particular, of organosilanes, especially alkoxysilane polysulphides or mercaptosilanes, or else polyorganosiloxanes bearing functions capable of bonding physically and/or chemically to the inorganic filler and functions capable of bonding physically and/or chemically to the elastomer, for example by means of a sulphur atom. Silica/elastomer bonding agents, in particular, have been described in a large number of documents, the best known being bifunctional alkoxysilanes such as alkoxysilane polysulphides. Use is made, in particular, of silane polysulphides, referred to as "symmetrical" or "asymmetrical" depending on their particular structure, as described for example in applications WO 03/002648 (or US 2005/016651) and WO 03/002649 (or US 2005/016650).

Mention will in particular be made, as coupling agent other than alkoxysilane polysulphide, of bifunctional POSs (polyorganosiloxanes), or else of hydroxysilane polysulphides as described in patent applications WO 02/30939 (or U.S. Pat. No. 6,774,255) and WO 02/31041 (or US 2004/051210), or else of silanes or POSs bearing azodicarbonyl functional groups, as described for example in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, as described for example in patents or patent applications U.S. Pat. No. 6,849,754, WO 99/09036, WO 2006/023815, WO 2007/098080, WO 2010/072685 and WO 2008/055986.

According to the particular embodiment of the invention where a halogenated butyl rubber is used, the coupling agent is preferably an aminoalkylalkoxysilane. The term "aminoalkylalkoxysilane" is understood to mean an alkylalkoxysilane in which the alkyl radical bears an amine group. The alkyl radical is preferably a $C_1$-$C_6$ radical, more preferably an ethyl or propyl radical. The alkoxy radical is preferably a $C_1$-$C_6$ radical, more preferably a $C_1$-$C_3$ radical, more preferably still a methoxy or ethoxy radical. The amine group is preferably $NH_2$. Furthermore, the aminoalkylalkoxysilane is advantageously an aminoalkyltrialkoxysilane. As aminoalkyltrialkoxysilane, 3-aminopropyltrimethoxysilane and 3-aminopropyltriethoxysilane are very particularly suitable.

According to this particular embodiment of the invention, the aminoalkylalkoxysilane may also be used as a mixture with another coupling agent of different chemical structure. Preferably, this mixture contains an aminoalkylalkoxysilane and an alkoxysilane polysulphide, in particular a mixture of 3-aminopropyltriethoxysilane and bis(3-triethoxysilylpropyl) tetrasulphide (TESPT).

The content of coupling agent, whether it is a single compound or a mixture of compounds, is advantageously less than 20 phr, it being understood that it is generally desirable to use the least possible thereof. Typically, the content of coupling agent represents from 0.5% to 15% by weight, with respect to the amount of inorganic filler. Its content is preferably between 0.5 and 12 phr, more preferably within a range of from 3 to 10 phr. This content is easily adjusted by a person skilled in the art depending on the content of inorganic filler used in the composition.

Alternatively, the coupling agent may be provided by the silica, the surface of which has been modified beforehand by an organosilane, such as bis(3-triethoxysilylpropyl) tetrasulphide or mercaptosilanes. Such silicas are sold by Evonik and PPG under the respective names "Coupsil" and "Ciptane".

The rubber composition of the tread in accordance with an embodiment of the invention may also contain coupling activators, agents for covering the inorganic fillers or more generally processing aids capable, in a known manner, by virtue of an improvement in the dispersion of the filler in the rubber matrix and of a lowering of the viscosity of the rubber composition, of improving its ease of processing in the uncured state, these agents being, for example, hydrolysable silanes, such as alkylalkoxysilanes, polyols, polyethers, primary, secondary or tertiary amines, or hydroxylated or hydrolysable polyorganosiloxanes.

The at least one polybutene oil has a glass transition temperature below −75° C., preferably below −85° C. and more preferably below −95° C.

According to one embodiment of the invention, the at least one polybutene oil is a homopolymer or copolymer of $C_4$ fraction raffinate. A $C_4$ fraction typically contains 44 to 49% of isobutylene, 24 to 28% of 1-butene, 19 to 21% of 2-butene, 6 to 8% of n-butane and 2 to 5% of isobutane, as described for example on page 73 of "Chimie Organique Industrielle" [Industrial Organic Chemistry], published by De Boeck Université, translation of the $3^{rd}$ English edition.

According to another embodiment of the invention, the at least one polybutene oil is a copolymer of at least isobutylene, 1-butene and 2-butene. The at least one polybutene oil may be a homopolymer of isobutylene, a copolymer of isobutylene and 1-butene or of isobutylene and 2-butene, or a terpolymer of isobutylene, 1-butene and 2-butene. The at least one polybutene oil typically consists of 40 to 100% of units derived from isobutylene, of 0 to 40% of units derived from 1-butene and of 0 to 40% of units derived from 2-butene. Preferably, the content of units derived from isobutylene is from 40 to 99% by weight of the weight of polybutene oil, that of units derived from 1-butene is from 2 to 40% by weight of the weight of polybutene oil and that of units derived from 2-butene is from 0 to 30% by weight of the weight of polybutene oil. More preferably, the content of units derived from isobutylene is from 40 to 96% by weight of the weight of polybutene oil, that of units derived from 1-butene is from 2 to 40% by weight of the weight of polybutene oil and that of units derived from 2-butene is from 2 to 20% by weight of the weight of polybutene oil. More preferably still, the at least one polybutene oil is a homopolymer or a copolymer consisting of 65 to 100% of units derived from isobutylene and 0 to 35% of units derived from 1-butene.

Typically, the number-average molar mass of the at least one polybutene oil is less than 10 000 g/mol, preferably less than 5000 g/mol, more preferably less than 2000 g/mol. It is typically between 400 g/mol and 10 000 g/mol, preferably between 400 g/mol and 5000 g/mol, more preferably between 400 g/mol and 2000 g/mol.

In the case where the plasticizing system contains several polybutene oils, each of the polybutene oils has any one of the features mentioned above that define the chemical structure, the number-average molar mass and the glass transition temperature of a polybutene oil according to the invention.

By way of example of polybutene oil, mention may be made of the products sold under the names "Dynapak Poly" and "Parapol" by UNIVAR and EXXON Mobil respectively, or else the polyisobutylenes sold by the TPC Group.

The at least one polybutene oil is used in the rubber composition generally at a content ranging from 10 to 80 phr, preferably from 15 to 60 phr, more preferably from 20 to 40 phr.

The content of polybutene oil is adjusted depending on its Tg and depending on the content of butyl rubber or halogenated butyl rubber in the elastomer matrix. For example, the higher the Tg of the polybutene oil, the larger the content thereof in the rubber composition.

According to one particularly preferred embodiment, the at least one polybutene oil has a number-average molar mass ranging from 400 g/mol to 2000 g/mol and is used at a content preferably ranging from 15 to 60 phr, more preferably still from 20 to 40 phr.

In the case where the polybutene oil consists of a mixture of polybutene oils, the content of polybutene oil applies to the mixture of polybutene oils.

According to one particularly preferred embodiment, the at least one polybutene oil constitutes the only plasticizer of the rubber composition, that is to say that the plasticizing system consists of the at least one polybutene oil. In the case where the plasticizing system consists of a mixture of polybutene oils according to an embodiment of the invention, the composition contains no plasticizers other than this mixture of polybutene oils.

According to another embodiment of the invention, the plasticizing system of the rubber composition may contain another plasticizer in addition to the at least one polybutene oil. This other plasticizer may itself have a glass transition temperature below −75° C. Alternatively, this other plasticizer may have a glass transition temperature above or equal to −75° C., such as for example the oils conventionally used in the rubber compositions, such as paraffinic, aromatic and naphthenic oils. This other plasticizer is used at a content preferably of between 0 and 30 phr, more preferably of between 0 and 15 phr.

According to one very particularly preferred embodiment that makes it possible to optimize even more the compromise between the rolling resistance performance and the wet grip performance, the mass content of the plasticizing system P expressed relative to the mass of the at least one butyl rubber and the glass transition temperature $Tg_P$ of the plasticizing system expressed in kelvin satisfy the following equation:

$$P \times (208 - Tg_P) \div Tg_P \geq 0.025$$

The mass content of the plasticizing system P expressed relative to the mass of the at least one butyl rubber is defined by the ratio of the mass of the plasticizing system to the sum of the mass of the plasticizing system and the mass of the at least one butyl rubber.

The rubber composition of the tread in accordance with an embodiment of the invention may also comprise all or some of the usual additives customarily used in rubber compositions intended for the manufacture of tires, such as, for example, pigments, protective agents, such as antiozone waxes, chemical antiozonants, antioxidants, antifatigue agents, a crosslinking system based either on sulphur or on sulphur donors and/or on peroxide and/or on bismaleimides, vulcanization accelerators, vulcanization activators and mixtures of such compounds.

The rubber composition of the tread in accordance with an embodiment of the invention may be manufactured in appropriate mixers, generally using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) up to a lower temperature, typically below 110° C., for example between 40° C. and 100° C., during which finishing phase the crosslinking system is incorporated.

The rubber composition of the tread in accordance with an embodiment of the invention may be prepared according to a process that comprises the following steps:

thermomechanically kneading the elastomer matrix that comprises more than 50% by weight of the at least one butyl rubber, the reinforcing filler and the plasticizing system, where appropriate the coupling agent and the other additives of the rubber composition with the exception of the crosslinking system, until a maximum temperature of between 110° C. and 190° C. is reached;

cooling the combined mixture to a temperature below 100° C.;

subsequently incorporating a crosslinking system;

kneading everything up to a maximum temperature below 110° C. in order to obtain a rubber composition.

The tread in accordance with an embodiment of the invention may be manufactured according to the process described above which comprises an additional step of calendering or extruding the rubber composition.

The invention relates to the tread described above, both in the uncured state (that is to say, before curing) and in the cured state (that is to say, after crosslinking or vulcanization). The invention also relates to the tire comprising a tread in accordance with an embodiment of the invention, which tire is both in the uncured state and in the cured state.

The crosslinking (or curing), where appropriate the vulcanization, is carried out in a known manner at a temperature generally of between 130° C. and 200° C., for a sufficient time which may vary, for example, between 5 and 90 min, depending in particular on the curing temperature, on the crosslinking system adopted and on the crosslinking kinetics of the composition in question.

The invention also relates to a rubber composition which has any one of the features of the rubber composition of the tread in accordance with an embodiment of the invention. This rubber composition, a particular subject of the invention, also has the essential feature of comprising an inorganic filler, preferably a silica, which constitutes more than 50% by weight of the reinforcing filler of the rubber composition. It also has the essential feature of comprising a coupling agent as defined above for bonding the inorganic filler, in particular silica, to the elastomer of the rubber composition.

The rubber composition, a particular subject of the invention, may be prepared according to a process that comprises the following steps:

thermomechanically kneading the elastomer matrix that comprises more than 50% by weight of the at least one butyl rubber, the reinforcing filler, the coupling agent and the plasticizing system until a maximum temperature of between 110° C. and 190° C. is reached;

cooling the combined mixture to a temperature below 100° C.;

subsequently incorporating a crosslinking system;

kneading everything up to a maximum temperature below 110° C. in order to obtain a rubber composition.

The aforementioned features of the invention, as well as others, will be better understood on reading the following description of several exemplary embodiments of the invention, given by way of non-limiting illustration.

Measurements and Tests Used

The number-average molar mass is determined by SEC ("Size Exclusion Chromatography") analysis.

As a reminder, the SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, for example tetrahydrofuran, at a concentration of 1 g/liter. The solution is then filtered through a filter, for example with a porosity of 0.45 μm, before injection into the apparatus. The apparatus used is, for example, a Waters Alliance chromatographic line. The elution solvent is, for example, tetrahydrofuran, the flow rate is 0.7 ml/min and the temperature of the system is 35° C. Use is made, for example, of a set of 4 Waters columns in series (names Styragel HMW7, Styragel HMW6E and two Styragel HT6E). The volume of the solution of the polymer sample injected is, for example, 100 μl. The detector is a differential refractometer (for example Waters 2410) which can be equipped with associated software for evaluating the data (for example Waters Millennium). A Moore calibration is carried out with a series of commercial polystyrene standards having a low PI (less than 1.2), with known molar masses, covering the range of masses to be analysed. The weight-average molar mass (Mw), the number-average molar mass (Mn) and the polydispersity index (PI=Mw/Mn) are deduced from the data recorded (curve of distribution by mass of the molar masses).

The glass transition temperature is measured by means of a differential calorimeter (differential scanning calorimeter) according to the standard ASTM D3418 (1999). In the case of a mixture of plasticizers, the measurement is carried out on the mixture of plasticizers in the relative proportions of those of the rubber composition of the tread in accordance with the invention.

The dynamic properties are measured on a viscosity analyser (Metravib VA4000) according to the standard ASTM D 5992-96. The response of a sample of vulcanized composition (cylindrical test specimen with a thickness of 2 mm and a cross section of 79 mm$^2$), subjected to a simple alternating sinusoidal shear stress, at a frequency of 10 Hz, under standard temperature conditions (23° C.) according to the standard ASTM D 1349-09, is recorded. A peak-to-peak strain amplitude sweep is carried out from 0.1% to 50% (forward cycle) and then from 50% to 0.1% (return cycle). The result evaluated is the loss factor tan δ. For the return cycle, the maximum value of tan δ observed (tan $\delta_{max}$) is indicated.

The loss factor at 23° C. is expressed relative to a base 100. Since the control has an index of 100, a value above 100 indicates that the composition of the example in question has a lower hysteresis at 23° C., expressing a lower rolling resistance of the tread comprising such a composition.

On the same equipment, the response of a sample of vulcanized composition (cylindrical test specimen with a thickness of 2 mm and a cross section of 79 mm$^2$) to a given stress, at a frequency of 10 Hz, under variable temperature conditions, is recorded. The result evaluated is the loss factor tan (δ) at −20° C. The loss factor is expressed relative to a base 100 with respect to the loss factor of the control composition. A value above 100 demonstrates a higher hysteresis of the composition considered, at −20° C., expressing a better grip on wet ground of the tread comprising such a composition.

Example 1

Preparation of the Rubber Compositions C0, C1, C2 and C3

The formulations (in phr) of the compositions C0, C1, C2 and C3 are described in Table I.

Compositions C1 to C3 all contain 100 phr of a brominated butyl rubber and 25 phr of plasticizer. They differ due to the nature of the plasticizer. The plasticizer of C1 is the polybutene oil TPC150 having a Tg of −103° C. The plasticizer of C2 is a mixture of two polybutene oils having a Tg of −103° C. and −84° C. respectively. The plasticizer of C3 is a polybutene oil having a Tg of −84° C.

Compositions C1, C2 and C3 are in accordance with the invention since the plasticizer or the plasticizer mixture has a Tg below −75° C. and is present in a content of between 10 and 50 phr in the rubber composition.

Composition C0 which is not in accordance with the invention contains no plasticizer. It contains 100 phr of a brominated butyl rubber, 74 phr of silica and 5 phr of carbon black as reinforcing filler, which corresponds to a volume fraction of reinforcing filler of 25% of the volume of the rubber composition. This volume fraction of reinforcing filler is identical to that of C1, C2 and C3.

For each of the compositions, the silane content and the diphenylguanidine content were adjusted as a function of the silica content present in the rubber composition.

In summary, compositions C1 to C3 differ from C0 in that they contain a plasticizer in accordance with the invention.

TABLE I

|  | C0 not in accordance | C1 in accordance | C2 in accordance | C3 in accordance |
|---|---|---|---|---|
| BIIR (1) | 100 | 100 | 100 | 100 |
| Silica (2) | 74 | 90 | 90 | 90 |
| Silane (3) | 4.8 | 6.0 | 6.0 | 6.0 |
| Carbon black N234 | 5 | 5 | 5 | 5 |
| Plasticizer (4) | 0 | 25 | 0 | 0 |
| Plasticizer (5) | 0 | 0 | 25 | 0 |
| Plasticizer (6) | 0 | 0 | 0 | 25 |
| ZnO | 2.5 | 2.5 | 2.5 | 2.5 |
| Stearic acid | 2.0 | 2.0 | 2.0 | 2.0 |
| Antioxidant (7) | 1.9 | 1.9 | 1.9 | 1.9 |
| Ozone wax | 1.5 | 1.5 | 1.5 | 1.5 |
| DPG (8) | 1.5 | 1.7 | 1.7 | 1.7 |
| Sulphenamide | 1.8 | 1.8 | 1.8 | 1.8 |
| Sulphur | 1.4 | 1.4 | 1.4 | 1.4 |

TABLE I-continued

|  | C0 not in accordance | C1 in accordance | C2 in accordance | C3 in accordance |
|---|---|---|---|---|
| Volume fraction of filler | 25% | 25% | 25% | 25% |
| Properties in the cured state |  |  |  |  |
| tan $\delta_{max}$ 23° C. | 100 | 110 | 105 | 100 |
| tan $\delta_{max}$ −20° C. | 100 | 118 | 115 | 126 |

(1) BIIR 3220 brominated butyl rubber from Lanxess
(2) Zeosil 1165 MP silica from Rhodia (HDS type)
(3) Aminopropyltriethoxysilane
(4) TPC150 polybutene oil from TPC, having a Tg of −103° C., Mn of 560, PI of 2.08
(5) Mixture of 12.5 phr of TPC150 polybutene oil and of 12.5 phr of Dynapak 190 polybutene oil from Dynapak, having a Tg of −84° C., Mn of 1190, PI of 1.62
(6) Dynapak 190 polybutene oil having a Tg of −84° C., Mn of 1190, PI of 1.62
(7) N-(1,3-dimethylbutyl)-N'-phenyl-p-phenylenediamine, from Flexsys
(8) diphenylguanidine (Perkacit DPG from Flexsys)

These compositions are manufactured in the following manner: the elastomer, the silica, the coupling agent, where appropriate the plasticizer, and also the various other ingredients, with the exception of the vulcanization system, are successively introduced into an internal mixer (final degree of filling: around 70% by volume), the initial vessel temperature of which is around 60° C. Thermomechanical working (non-productive phase) is then carried out in one step, which lasts in total 5 min, until a maximum "dropping" temperature of 165° C. is reached. The mixture thus obtained is recovered and cooled and then sulphur and an accelerator of sulphenamide type are incorporated on a mixer (homofinisher) at 23° C., everything being mixed (productive phase) for an appropriate time (for example between 5 and 12 min).

The properties of compositions C0 to C3 after curing appear in Table I.

It is observed that compositions C1 to C3 have higher hysteresis at −20° C. than the control composition C0, without degrading the hysteresis at 23° C. These results show that introducing polybutene oil in accordance with the invention into a butyl rubber composition enables a significant gain in grip on wet ground for a tire comprising a tread based on butyl rubber without adversely affecting its rolling resistance performance. The compromise between the wet grip performance and the low rolling resistance performance of a tread based on butyl rubber is improved.

Compositions C1 and C2 are in accordance with the particular and preferred embodiment according to which the content of plasticizer and its glass transition temperature satisfy the equation P×(208−Tg$_P$)÷Tg$_P$≥0.025. Compositions C1 and C2 have both lower hysteresis at 23° C. and higher hysteresis at −20° C. than the control composition C0 and therefore have a better compromise than composition C3 also in accordance with the invention, but which is not in accordance with this particular and preferred embodiment which is characterized by a hysteresis at 23° C. similar to that of the control. These results show an even more significant improvement in the compromise of low rolling resistance performance and wet grip performance of a tire comprising a tread based on butyl rubber in accordance with this particular embodiment.

Example 2

A rubber composition C4, the formulation of which (in phr) is recorded in Table II, was prepared in the same way as compositions C1 to C3. Composition C4 contains 100 phr of a brominated butyl rubber and 25 phr of polybutene oil having a Tg of −84° C. In accordance with the invention, it is used as tread of a radial carcass passenger vehicle tire, denoted by P-C4, of 205/55R16 size that is conventionally manufactured.

Except for the constituent rubber composition of the tread, the P-C4 tire is in all respects identical to a "Primacy HP" reference tire, used as a reference as regards grip on wet ground. The performance of the P-C4 tire is compared to that of the "Primacy HP" reference tire. The results appear in Table II.

For the tire tests, all the tires are fitted to the front and rear of a motor vehicle, under nominal inflation pressure.

The tires fitted to a motor vehicle of Renault make and "Mégane" model, equipped with an ABS system, are subjected to braking tests on wet ground at 25° C. that consist in measuring the distance needed to go from 80 km/h to 10 km/h during sudden braking on sprayed ground (bituminous concrete). A value greater than that of the control, arbitrarily set at 100, indicates an improved result, that is to say a shorter braking distance.

The rolling resistance is measured on a flywheel, according to the ISO 87-67 (1992) method. A value greater than that of the control, arbitrarily set at 100, indicates an improved result, that is to say a lower rolling resistance.

TABLE II

|  | C4 |
|---|---|
| BIIR (1) | 100 |
| Silica (2) | 90 |
| Silane (3) | 6.6 |
| Carbon black N234 | 5 |
| Plasticizer (4) | 25 |
| ZnO | 2.5 |
| Stearic acid | 2.0 |
| Antioxidant (5) | 1.9 |
| Ozone wax | 1.5 |
| DPG (6) | 1.7 |
| Sulphenamide | 1.5 |
| Sulphur | 2 |
| Volume fraction of filler | 25% |
| Tire properties | P-C4 |
| Rolling resistance | 95 |
| Wet grip | 141 |

(1) BIIR 3220 brominated butyl rubber from Lanxess
(2) Zeosil 1165 MP silica from Rhodia (HDS type)
(3) Mixture of 3 phr of aminopropyltriethoxysilane and 3.6 phr of TESPT
(4) Dynapak 190 polybutene oil
(5) N-(1,3-dimethylbutyl)-N'-phenyl-p-phenylenediamine, from Flexsys
(6) diphenylguanidine (Perkacit DPG from Flexsys)

It is observed that the P-C4 tire has a greatly improved wet grip performance relative to that of the reference tire, and this with a small reduction in the rolling resistance.

These tire tests corroborate the results from Example 1 that demonstrated the potential of the rubber compositions as tread material which have an improved compromise between the wet grip performance and the rolling resistance performance.

The invention claimed is:
1. A tire tread that comprises a rubber composition based:
    on an elastomer matrix that comprises more than 50% by weight of at least one butyl rubber,
    on a reinforcing filler,
    and on a plasticizing system that comprises at least one polybutene oil having a glass transition temperature below −75° C.
2. The tread according to claim 1, wherein the at least one polybutene oil has a glass transition temperature below −85° C.

3. The tread according to claim 1, wherein the at least one butyl rubber represents more than 70% by weight of the elastomer matrix.

4. The tread according to claim 3, wherein the at least one butyl rubber represents 100% by weight of the elastomer matrix.

5. The tread according to claim 1, wherein the at least one butyl rubber is a copolymer of isobutylene and a $C_4$ to $C_6$ diene.

6. The tread according to claim 5, wherein the at least one butyl rubber is a halogenated butyl rubber.

7. The tread according to claim 1, wherein the at least one butyl rubber is a terpolymer of isobutylene, para-methylstyrene and halogenated para-methylstyrene.

8. The tread according to claim 1, wherein the number-average molar mass of the at least one polybutene oil is between 400 g/mol and 10 000 g/mol.

9. The tread according to claim 1, wherein the content of the at least one polybutene oil varies within a range extending from 10 to 80 phr.

10. The tread according to claim 1, wherein the at least one polybutene oil is a homopolymer or copolymer of $C_4$ fraction raffinate.

11. The tread according to claim 1, wherein the at least one polybutene oil is a homopolymer of isobutylene.

12. The tread according to claim 1, wherein the at least one polybutene oil is a copolymer of isobutylene and 1-butene or a copolymer of isobutylene and 2-butene.

13. The tread according to claim 1, wherein the at least one polybutene oil is a terpolymer of isobutylene, 1-butene and 2-butene.

14. The tread according to claim 1, wherein the plasticizing system comprises between 0 and 30 phr of at least a second plasticizer.

15. The tread according to claim 1, wherein the plasticizing system consists of the at least one polybutene oil.

16. The tread according to claim 1, wherein the mass content of the plasticizing system P expressed relative to the mass of the at least one butyl rubber and the glass transition temperature $Tg_P$ of the plasticizing system expressed in kelvin satisfy the following equation:

$$P \times (208 - Tg_P) \div Tg_P \geq 0.025.$$

17. The tread according to claim 1, wherein the content of reinforcing filler is between 40 and 150 phr.

18. The tread according to claim 1, wherein the reinforcing filler comprises a reinforcing organic filler.

19. The tread according to claim 1, wherein the reinforcing filler comprises a reinforcing inorganic filler.

20. The tread according to claim 19, wherein the composition additionally comprises a coupling agent.

21. The tread according to claim 20, wherein the at least one butyl rubber is a halogenated butyl rubber and the coupling agent is an aminoalkylalkoxysilane or a mixture of aminoalkylalkoxysilane and alkylalkoxysilane polysulphide.

22. The tread according to claim 20, wherein the reinforcing inorganic filler represents more than 50% by weight of the reinforcing filler.

23. The tread according to claim 22, wherein the content of carbon black in the rubber composition is less than 20 phr.

24. A process for preparing a tire tread according to claim 1, which process comprises:
   thermomechanically kneading the elastomer matrix that comprises more than 50% by weight of the at least one butyl rubber, the reinforcing filler and the plasticizing system until a maximum temperature of between 110° C. and 190° C. is reached;
   cooling the combined mixture to a temperature below 100° C.;
   subsequently incorporating a crosslinking system;
   kneading everything up to a maximum temperature below 110° C. in order to obtain a rubber composition;
   extruding or calendering the rubber composition thus obtained.

25. A tire comprising a tread according to claim 1.

26. A rubber composition as defined in claim 22.

27. A process for manufacturing the rubber composition according to claim 26, which process comprises:
   thermomechanically kneading the elastomer matrix that comprises more than 50% by weight of the at least one butyl rubber, the reinforcing filler, the coupling agent and the plasticizing system until a maximum temperature of between 110° C. and 190° C. is reached;
   cooling the combined mixture to a temperature below 100° C.;
   subsequently incorporating a crosslinking system;
   kneading everything up to a maximum temperature below 110° C. in order to obtain a rubber composition.

* * * * *